Figure 1:
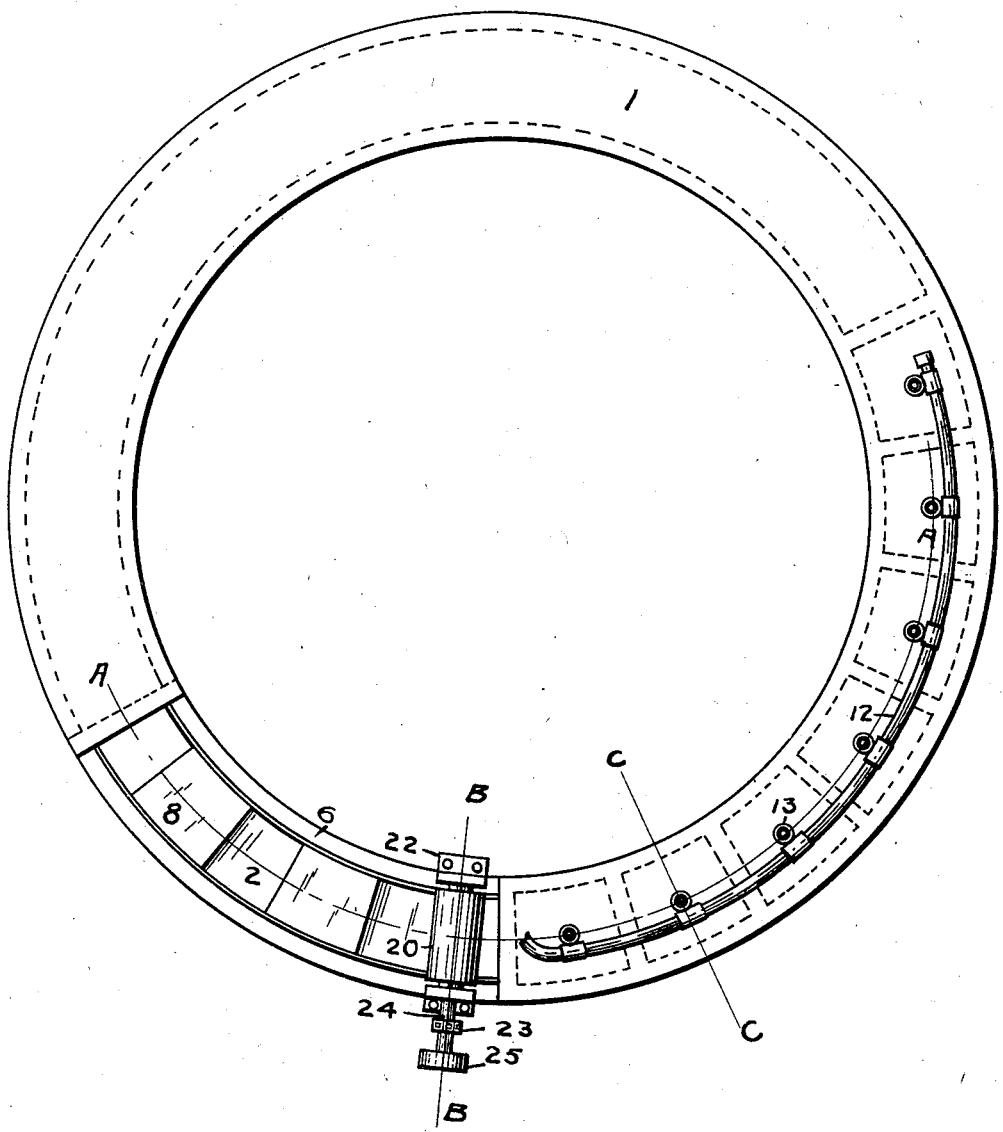

No. 694,711. Patented Mar. 4, 1902.
J. A. ANDERSON & C. M. HOLLINGSWORTH.
GLASS FLATTENING AND ANNEALING APPARATUS.
(Application filed Jan. 21, 1901.)
(No Model.) 3 Sheets—Sheet 1.

WITNESSES:
INVENTORS

No. 694,711. Patented Mar. 4, 1902.
J. A. ANDERSON & C. M. HOLLINGSWORTH.
GLASS FLATTENING AND ANNEALING APPARATUS.
(Application filed Jan. 21, 1901.)
(No Model.) 3 Sheets—Sheet 2.
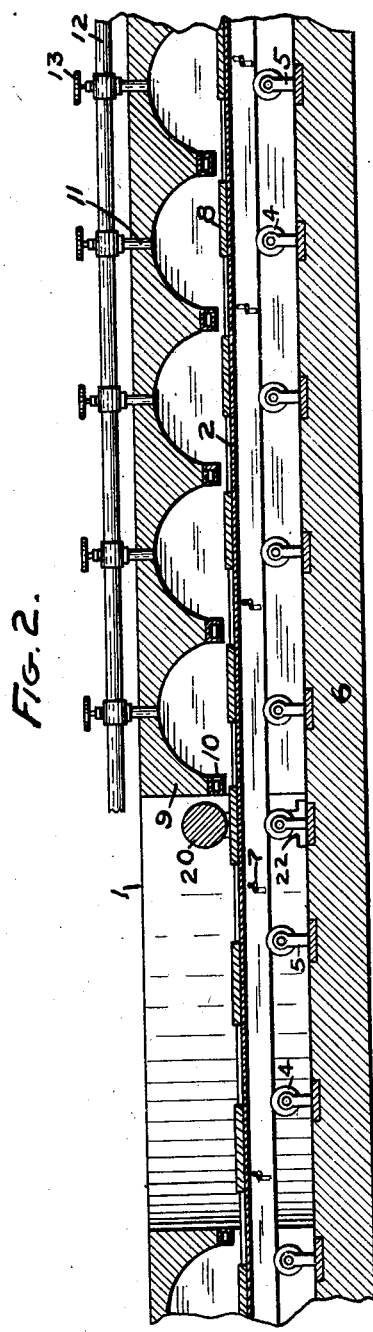
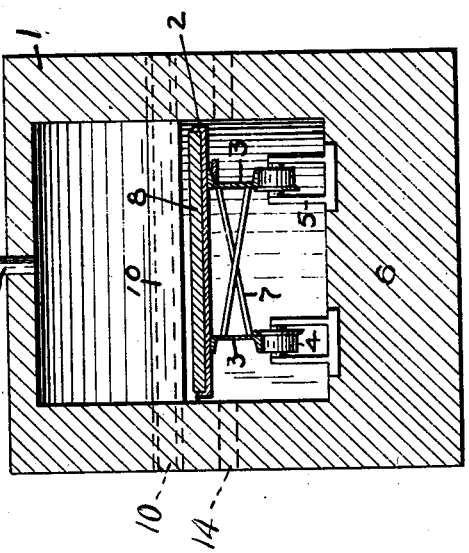
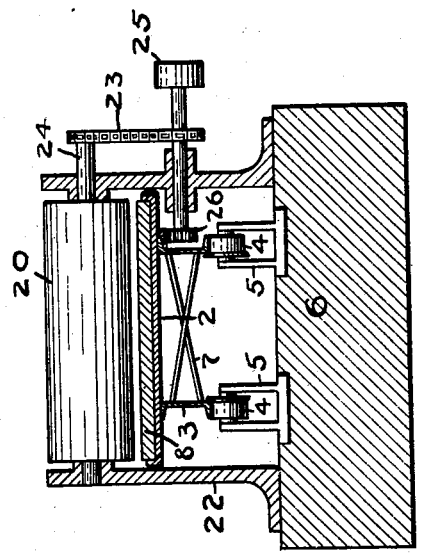

No. 694,711. Patented Mar. 4, 1902.
J. A. ANDERSON & C. M. HOLLINGSWORTH.
GLASS FLATTENING AND ANNEALING APPARATUS.
(Application filed Jan. 21, 1901.)

(No Model.) 3 Sheets—Sheet 3.

WITNESSES: Laura Hitt, G. H. Blaker

INVENTORS James A. Anderson and Clarence M. Hollingsworth.
BY V. H. Lockwood. Their ATTORNEY.

UNITED STATES PATENT OFFICE.

JAMES A. ANDERSON AND CLARENCE M. HOLLINGSWORTH, OF OTTAWA, ILLINOIS, ASSIGNORS OF ONE-THIRD TO JOHN R. JOHNSTON, OF HARTFORD CITY, INDIANA.

GLASS FLATTENING AND ANNEALING APPARATUS.

SPECIFICATION forming part of Letters Patent No. 694,711, dated March 4, 1902.

Application filed January 21, 1901. Serial No. 44,130. (No model.)

*To all whom it may concern:*

Be it known that we, JAMES A. ANDERSON and CLARENCE M. HOLLINGSWORTH, of Ottawa, county of Lasalle, and State of Illinois, have invented a certain new and useful Glass Flattening and Annealing Apparatus; and we do hereby declare that the following is a full, clear, and exact description thereof, reference being had to the accompanying drawings, in which like figures refer to like parts.

The general object of this invention is to provide a novel means for flattening and annealing plate or sheet glass.

An annealing-furnace is arranged in the arc of a circle with an endless conveyer movable through it and a series of glass-flattening tables or stones mounted on the conveyer. The invention consists in combining with the foregoing means for flattening the glass on the said tables or stones as or immediately before they enter the furnace. A valuable means for flattening is permitted by this arrangement, consisting of a roller immediately under which the conveyer and series of flattening-stones pass and which is driven by the same means that drives the conveyer.

The object of this invention is to provide a rapidly-operating glass flattening and annealing apparatus where the glass when cooled is brought back to the starting-point and there can be removed, thus limiting the operation of said apparatus to one point. It is a practical combination of means for both flattening and annealing the glass instead of having such means separated, as heretofore. Therefore the flattening apparatus can be placed immediately adjacent the annealing-furnace, so that the glass passes immediately from the flattener into the furnace or can be flattened in the first chamber of the furnace. One of the most valuable advantages of this arrangement is that the glass does not have to be handled during the annealing or be moved from the flattener to an independent annealing part of the apparatus. No loss of glass therefore ensues due to handling the same, as has heretofore been experienced in other apparatus. Likewise a uniformly-smooth thickness of glass can be provided with the combination of a roller and stone so arranged that the glass passes immediately from the roller into the furnace. These and the other features of our invention will more fully appear from the accompanying drawings and the following description and claims.

Figure 5:
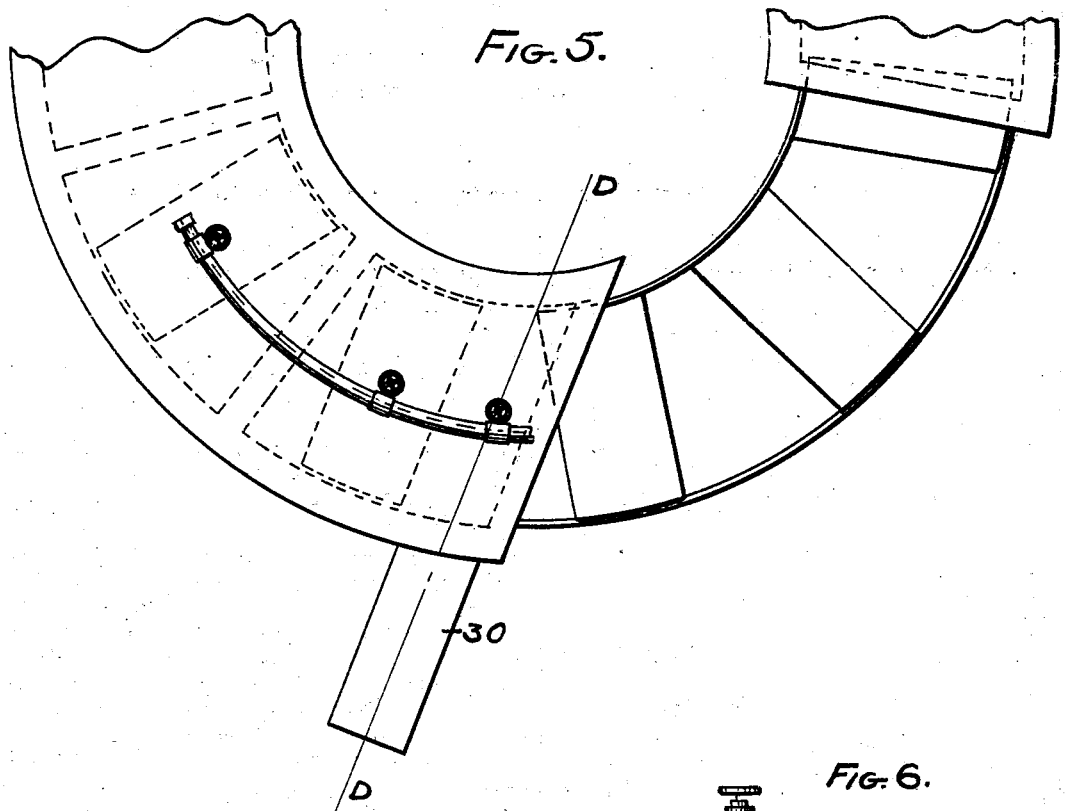
Figure 6:
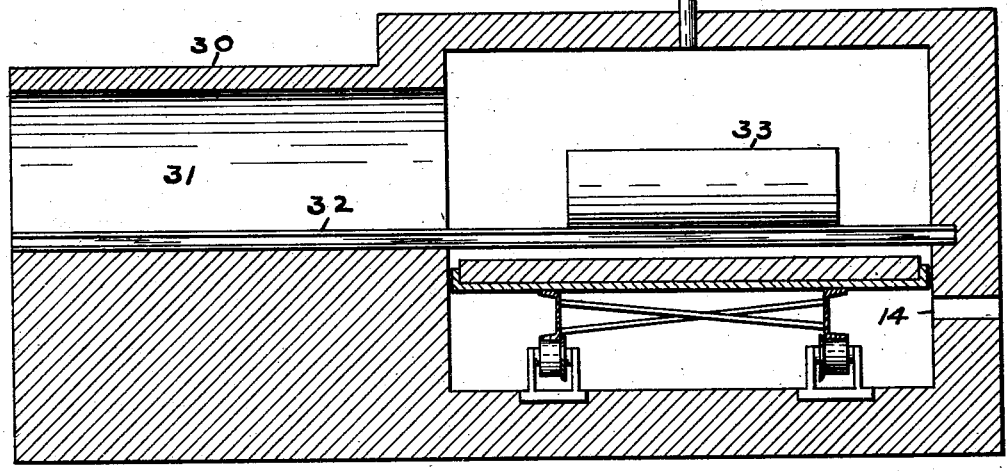

In the drawings, Figure 1 is a plan of our glass flattening and annealing apparatus. Fig. 2 is a central longitudinal vertical section on the line A A of Fig. 1. Fig. 3 is a vertical transverse section on the line B B of Fig. 1. Fig. 4 is a transverse vertical section on the line C C of Fig. 1. Fig. 5 is a plan of a portion of a modified form and arrangement of the apparatus. Fig. 6 is a vertical section on the line D D of Fig. 5.

In detail we make a furnace 1, of brick, stone, or any suitable material, arranged in the arc of a circle that brings the ends close together, but not meeting, and in this annular furnace an endless conveyer 2, iron or any suitable material, is provided. Said conveyer is secured to the upper edges of a pair of angle-bars 3, made of iron, whose lower edges rest upon an inner and outer series of metal rollers 4, carried in the bearings 5, secured to the base 6 of the furnace, that extends throughout the circle, said base being made of brick, stone, or any suitable material. Said angle-bars are strengthened by the metal braces 7. The conveyer is substantially of the same width as the furnace, so as to leave a space below and a space above. Upon said conveyer at suitable intervals flattening tables or stones 8 are secured and held in place by the vertical upturned sides of the conveyer, as shown.

The furnace is divided into a series of ovens or heating-chambers by the depending mantels or partitions 9, having on their lower transverse edges the air-boxes 10, immediately beneath which the conveyer passes. Only a portion of the furnace is divided thus into ovens, while the remaining portion forms only one continuous chamber, called a "cooling-chamber," and for which no heating apparatus is provided. The other chambers or ovens are heated by natural-gas pipes 11, entering the top of each oven centrally and leading from the gas-supply pipe 12 and controlled by the valves 13, whereby each oven has an independently-controllable means for regulating its temperature. The heat from said pipes 11 is turned directly down upon the glass, and the partitions so closely approach the conveyer that the heat of each oven is retained within itself. Likewise the heat is kept above the conveyer, so that the chamber below the conveyer is comparatively cool and is in fact kept cool by the openings 14 to the outside.

In the form shown in the first four figures the flattening is done by the roller 20, whose spindle 21 is carried in the bearing-posts 22, secured to the base 6. It is driven by the sprocket-chain 23, running from a sprocket-wheel on the end of the spindle 21 to a sprocket-wheel on the driving-shaft 24, which is mounted in one of the posts 22. Said driving-shaft 24 is driven from a suitable source of power through the pulley 25, and it not only rotates the roller 20, but also actuates the conveyer by means of a pinion 26, meshing with a rack 27 on the under side of the conveyer. By driving the roller and conveyer with a common means they can be made to move at the same speed, which is desirable in flattening glass.

A modified arrangement is shown in Figs. 5 and 6, where a similar furnace is provided with longer flattening tables or stones and means for bringing the sheet of glass to the annealing-furnace and flattening tables or stones. This means consists of an extension 30 from the furnace, leading from the first oven in the series and having a passage-way 31 in it, on the floor of which there are a pair of rails 32 to form a track upon which the sheet of glass 33 is pushed from the outside into the furnace, as shown in Fig. 6. The track 32 is directly beside or parallel with the flattening table or stone, and a workman with a tool lifts the curled sheet of glass 33 from the track 32 upon the flattening table or stone beside it, upon which the sheet of glass is gradually flattened as it becomes heated, and then as the conveyer moves it is carried into another oven and on through the annealing-furnace. With natural gas as fuel no chimney is used. Said Fig. 6 merely shows how an old form of introducing the glass is used with our annealing-oven and does not show the partitions between the ovens or the curvature of the top of the oven therein shown for the sake of avoiding confusion by reason of the drawing or shading that would be necessary to bring out these features of the construction, which are shown fully in the other figures.

What we claim as our invention, and desire to secure by Letters Patent, is—

1. The combination of an annealing-furnace, a conveyer passing therethrough with flattening tables or stones on it, and a roller mounted immediately over the conveyer whereby the glass is pressed and flattened as it passes under the roller.

2. The combination of an annealing-furnace, a conveyer passing therethrough with flattening tables or stones on it, and a pair of bearing-posts extending up at each side of said conveyer, and a roller mounted in said bearing-posts immediately over the conveyer, whereby the glass will be pressed and flattened as it passes under the roller.

3. The combination of an annealing-furnace, a conveyer passing therethrough with flattening tables or stones on it, and a roller mounted immediately above the conveyer whereby the glass will be pressed and flattened as it passes beneath the roller, and means for driving the conveyer and roller at the same surface speed.

In witness whereof we have hereunto affixed our signatures in the presence of the witnesses herein named.

JAMES A. ANDERSON.
CLARENCE M. HOLLINGSWORTH.

Witnesses as to Anderson:
 LAURA HITT,
 V. H. LOCKWOOD.

Witnesses as to Hollingsworth:
 GEORGE J. GLEIM,
 J. H. IMME.